United States

Nakagawa

[11] 4,061,421

[45] Dec. 6, 1977

[54] RETROFOCUS TYPE LENS SYSTEM HAVING ULTRA-WIDE ANGLE OF VIEW

[75] Inventor: Jihei Nakagawa, Higashimurayama, Japan

[73] Assignee: Olympus Optical Co., Ltd., Japan

[21] Appl. No.: 700,951

[22] Filed: June 29, 1976

[30] Foreign Application Priority Data

June 30, 1975 Japan .................. 50-80643

[51] Int. Cl.² .......................... G02B 13/04
[52] U.S. Cl. ................................ 350/214
[58] Field of Search ........................ 350/214

[56] References Cited

U.S. PATENT DOCUMENTS 3,981,563  9/1976  Nakamura ............ 350/214

Primary Examiner—Conrad J. Clark
Attorney, Agent, or Firm—Cushman, Darby & Cushman

[57] ABSTRACT

A retrofocus type lens system having ultra-wide angle of view comprising a first positive meniscus lens component, a second negative meniscus lens component, a third negative meniscus lens component, a fourth positive lens component, a fifth negative meniscus lens component, a sixth lens component having positive refractive power, a seventh lens component having negative refractive power, an eighth positive meniscus lens component and a ninth positive lens component. Said lens system is so designed as to have a long back focal length and correct distortion, lateral chromatic aberration and so on.

3 Claims, 7 Drawing Figures

SPHERICAL ABERRATION
SINE CONDITION
1:3.5

ASTIGMATISM
50°

DISTORTION
50°

SPHERICAL ABERRATION
SINE CONDITION
1:3.5

ASTIGMATISM
50°

DISTORTION
50°

RETROFOCUS TYPE LENS SYSTEM HAVING ULTRA-WIDE ANGLE OF VIEW

BACKGROUND OF THE INVENTION a. Field of the Invention

The present invention relates to a retrofocus type lens system having ultra-wide angle of view and long back focal length.

b. Description of the Prior Art

Retrofocus type lenses having ultra-wide angle of view exceeding 90° and long back focal length have a such a common nature that meridional image surface, distortion and lateral chromatic aberration are undercorrected at intermediate angle of view when such aberrations are favorably corrected at marginal angles of view and, on the other hand, such aberrations are overcorrected at marginal angles of view when they are favorably corrected at intermediate angle of view. It is therefore difficult to correct the above-mentioned aberrations both at intermediate and marginal angles of view and, in the present circumstances, it is managed to correct the aberrations by increasing lens components to enhance flexibility for correcting the aberrations. Since lens systems are generally so designed as to correct aberrations for objects at infinite distance, meridional image surface is remarkably varies to extremely degrade resolution of image at marginal portion when the lens systems are focused on objects at short distances.

SUMMARY OF THE INVENTION

A general object of the present invention is to provide a retrofocus type lens system having an ultra-wide angle of view which is characterized especially in the composition of its front diverging lens group so adapted as to have a long focal length and favorably correct distortion, lateral chromatic aberration, etc. As is understood from FIG. 1, the lens system according to the present invention comprises a first positive meniscus lens component, a second negative meniscus lens component, a third negative meniscus lens component, a fourth positive lens component, a fifth negative meniscus lens component, a sixth positive thick lens component, a stop, a seventh negative thick lens component, an eighth positive meniscus lens component and a ninth positive lens component.

The lens system according to the present invention is so designed as to satisfy the following conditions:

1. $1.8f < f_B < 2.3f$
2. $4.5f < f_1 < 6.5f$
3. $4.5f < f_4 < 6f$
4. $0.05f < d_{10} < 0.1f$
5. $0.6f < D_6 < 0.75f$ wherein, the reference symbols represent as defined below:

$f$: focal length of the entire lens system as a whole
$f_B$: back focal length of the entire lens system as a whole
$f_1$: focal length of the first lens component
$f_4$: focal length of the fourth lens component
$d_{10}$: airspace between the fifth and sixth lens components
$D_6$: thickness of the sixth lens component ($d_{11} + d_{12}$)

The lens system according to the present invention is characterized by the facts that the first lens component through which oblique rays pass at the highest portion is a positive meniscus lens component serving for enhancing the effect of positive lens component in the diverging lens group and that the fourth lens component is another positive lens component which cooperates with the first lens component so as to cancel the negative distorsion and other aberrations produced by the second and third negative meniscus lens components.

Now, the significance of the above-defined conditions will be described consecutively below:

The condition (1) defines applicable range of the lens system according to the present invention. That is to say, when $f_B$ is shorter than $1.8f$, the characteristics of retrofocus type lens systems having wide angle of view, i.e., meridional image surface, distortion and lateral chromatic aberration are not so remarkable and can favorably be corrected without adopting such a lens composition as is provided by the present invention, but it is impossible to obtain a long back focal length. When $f_B$ is longer than $2.3f$, on the other hand, it will be impossible to favorably correct the above-mentioned aberrations.

The conditions (2) and (3) are required for assuring proper effects of the first and fourth positive lens components in the diverging lens group. If $f_1$ and $f_4$ are shorter than $4.5f$ respectively ($f_1 < 4.5f$ and $f_4 < 4.5f$), it is necessary to impart stronger refractive power to the negative lens components for obtaining back focal length $f_B$ within the range defined by the condition (1), but such strong refractive power will unfavorably aggravate various aberrations. If $f_1$ is longer than $6.5f$ ($f_1 > 6.5f$) and $f_4$ is longer than $6f$ ($f_4 > 6f$), on the other hand, the first and fourth positive lens components can not exhibit their effects sufficiently, making it impossible to favorably correct negative distortion, lateral chromatic aberration, etc.

When $d_{10}$ is shorter than $0.05f$ in the condition (4), the airspace is effective for correcting aberrations but makes it impossible to obtain sufficient intensity of rays at marginal angles of view. If $d_{10}$ is longer than $0.1f$ ($d_{10} > 0.1f$), spherical aberration will be undercorrected and, if some measure is taken to favorably correct the spherical aberration, coma and other aberrations will be aggravated.

When $D_6$ is shorter than $0.6f$ ($D_6 < 0.6f$) in the condition (5), it will be impossible to favorably correct astigmatism, spherical aberration, distortion, etc. On the other hand, $D_6$ longer than $0.75f$ ($D_6 > 0.75f$) is undesirable since it unavoidably prolongs the total length of the entire lens system.

Further, meridional image surface is remarkably varied to degrade resolution when a retrofocus type lens system having wide angle of view is focused on an object at a short distance as is already described at the beginning of this specification. This defect is more aggravated as image size increases. For correcting this defect, it is insufficient to displace forward the entire lens system and there have been contrived various mechanisms for correcting aberrations for object at a short distance by moving especially some specific lens component while advancing the entire lens system. In the lens system according to the present invention, the first and second lens components are fixed, whereas the third through ninth lens components are movably arranged for making it possible to focus the lens system on an object at a short distance and, at the same time, to favorably correct aberrations without varying meridional image surface.

DESCRIPTION OF THE PREFERRED EMBODIMENTS

Embodiment 1

Figure 1:
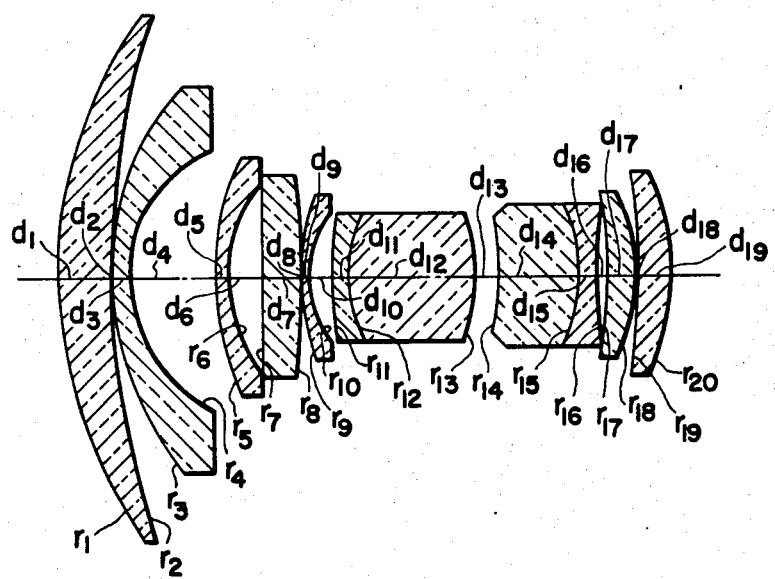
FIG. 1 shows a sectional view illustrating the composition of the lens system according to the present invention.
Figure 2A:
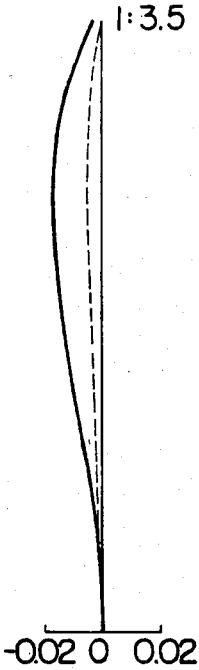
FIG. 2A through FIG. 2C show curves illustrating the aberration characteristics of the Embodiment 1.
Figure 2B:
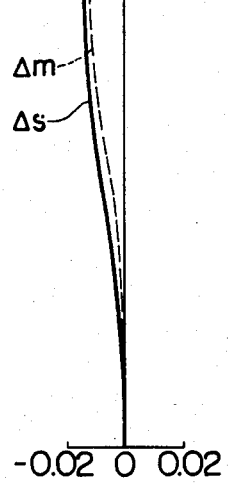
Figure 2C:
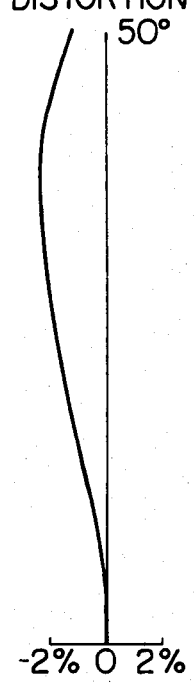
Figure 3A:
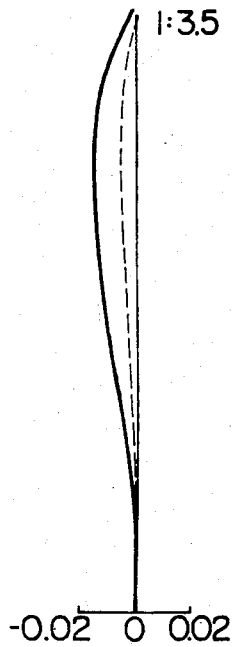
FIG. 3A through FIG. 3C show curves illustrating the aberration characteristics of the Embodiment 2.
Figure 3B:
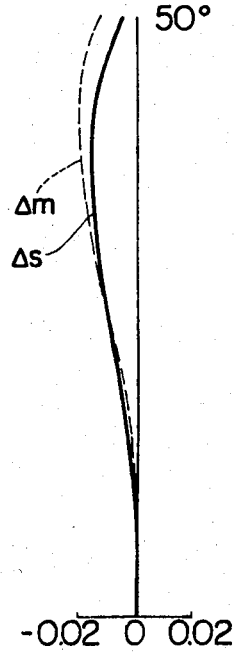
Figure 3C:
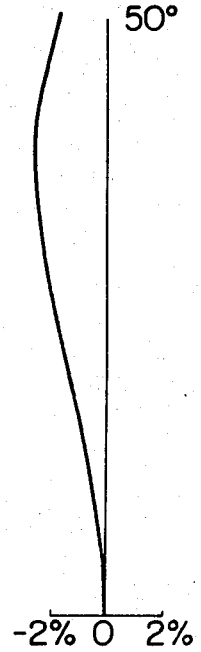

| | | | |
|---|---|---|---|
| $r_1 = 1.9603$ | | | |
| | $d_1 = 0.2435$ | $n_1 = 1.6516$ | $\nu_1 = 58.7$ |
| $r_2 = 3.6956$ | | | |
| | $d_2 = 0.0054$ | | |
| $r_3 = 1.3287$ | | | |
| | $d_3 = 0.0812$ | $n_2 = 1.8061$ | $\nu_2 = 40.9$ |
| $r_4 = 0.6476$ | | | |
| | $d_4 = 0.3884$ | | |
| $r_5 = 1.2674$ | | | |
| | $d_5 = 0.0541$ | $n_3 = 1.8061$ | $\nu_3 = 40.9$ |
| $r_6 = 0.6552$ | | | |
| | $d_6 = 0.1477$ | | |
| $r_7 = 6.2049$ | | | |
| | $d_7 = 0.1823$ | $n_4 = 1.78472$ | $\nu_4 = 25.7$ |
| $r_8 = -10.4225$ | | | |
| | $d_8 = 0.0054$ | | |
| $r_9 = 1.1000$ | | | |
| | $d_9 = 0.0541$ | $n_5 = 1.6675$ | $\nu_5 = 41.9$ |
| $r_{10} = 0.5763$ | | | |
| | $d_{10} = 0.0741$ | | |
| $r_{11} = 1.4141$ | | | |
| | $d_{11} = 0.0812$ | $n_6 = 1.757$ | $\nu_6 = 47.9$ |
| $r_{12} = 0.5532$ | | | |
| | $d_{12} = 0.5843$ | $n_7 = 1.64769$ | $\nu_7 = 33.8$ |
| $r_{13} = -0.7845$ | | | |
| | $d_{13} = 0.1055$ | | |
| $r_{14} = -1.6733$ | | | |
| | $d_{14} = 0.3706$ | $n_8 = 1.7432$ | $\nu_8 = 49.4$ |
| $r_{15} = -0.7836$ | | | |
| | $d_{15} = 0.0812$ | $n_9 = 1.80518$ | $\nu_9 = 25.4$ |
| $r_{16} = 3.7807$ | | | |
| | $d_{16} = 0.0438$ | | |
| $r_{17} = -1.9328$ | | | |
| | $d_{17} = 0.1353$ | $n_{10} = 1.618$ | $\nu_{10} = 63.4$ |
| $r_{18} = -0.7769$ | | | |
| | $d_{18} = 0.0054$ | | |
| $r_{19} = -5.9327$ | | | |
| | $d_{19} = 0.1515$ | $n_{11} = 1.618$ | $\nu_{11} = 63.4$ |
| $r_{20} = -1.1730$ | | | |
| $f = 1.0,$ | | $f_B = 2.0154$ | |
| $f_1 = 6.07,$ | | $f_4 = 4.98$ | |

Embodiment 2

| | | | |
|---|---|---|---|
| $r_1 = 1.7817$ | | | |
| | $d_1 = 0.2433$ | $n_1 = 1.6516$ | $\nu_1 = 58.7$ |
| $r_2 = 3.4447$ | | | |
| | $d_2 = 0.0054$ | | |
| $r_3 = 1.1695$ | | | |
| | $d_3 = 0.0811$ | $n_2 = 1.8061$ | $\nu_2 = 40.9$ |
| $r_4 = 0.6110$ | | | |
| | $d_4 = 0.3103$ | | |
| $r_5 = 1.8022$ | | | |
| | $d_5 = 0.0541$ | $n_3 = 1.8061$ | $\nu_3 = 40.9$ |
| $r_6 = 0.7048$ | | | |
| | $d_6 = 0.1854$ | | |
| $r_7 = 7.2191$ | | | |
| | $d_7 = 0.1768$ | $n_4 = 1.78472$ | $\nu_4 = 25.7$ |
| $r_8 = -10.3874$ | | | |
| | $d_8 = 0.0054$ | | |
| $r_9 = 1.1716$ | | | |
| | $d_9 = 0.0541$ | $n_5 = 1.66755$ | $\nu_5 = 41.9$ |
| $r_{10} = 0.6349$ | | | |
| | $d_{10} = 0.0746$ | | |
| $r_{11} = 1.3307$ | | | |
| | $d_{11} = 0.0811$ | $n_6 = 1.757$ | $\nu_6 = 47.9$ |
| $r_{12} = 0.5316$ | | | |
| | $d_{12} = 0.6140$ | $n_7 = 1.64769$ | $\nu_7 = 33.8$ |
| $r_{13} = -0.8921$ | | | |
| | $d_{13} = 0.1081$ | | |
| $r_{14} = -2.2067$ | | | |
| | $d_{14} = 0.3563$ | $n_8 = 1.7432$ | $\nu_8 = 49.4$ |
| $r_{15} = -0.8404$ | | | |
| | $d_{15} = 0.0811$ | $n_9 = 1.80518$ | $\nu_9 = 25.4$ |
| $r_{16} = 3.2781$ | | | |
| | $d_{16} = 0.0438$ | | |
| $r_{17} = -1.9646$ | | | |
| | $d_{17} = 0.1351$ | $n_{10} = 1.618$ | $\nu_{10} = 63.4$ |
| $r_{18} = -0.8301$ | | | |
| | $d_{18} = 0.0054$ | | |
| $r_{19} = -8.1453$ | | | |
| | $d_{19} = 0.1514$ | $n_{11} = 1.618$ | $\nu_{11} = 63.4$ |
| $r_{20} = -1.1405$ | | | |
| $f = 1.0,$ | | $f_B = 2.0154$ | |
| $f_1 = 5.35,$ | | $f_4 = 5.45$ | | wherein, the reference symbols represent as follows:

$r_1$ through $r_{20}$: radii of curvature on the surfaces of the respective lens components $d_1$ through $d_{19}$: thicknesses of the respective lens components and airspaces therebetween $n_1$ through $n_{11}$: refractive indices of the respective lens components $\nu_1$ through $\nu_{11}$: Abbe's numbers of the respective lens components Of the embodiments described above, the Embodiment 1 is so designed that it can be brought in focus by advancing the third through ninth lens components as a whole and that aberrations can be favorably corrected in photographing an object at a short distance.

When the third through ninth lens components are advanced as described above to bring the entire lens system in focus with an object at a distance of 30 cm (magnification ×0.1), $d_4$ has a value of 0.2534.

Though the sixth and seventh lens components are designed as positive and negative cemented doublet lens components respectively, it is possible to design them as single-element lens components having positive and negative refractive powers respectively.

I claim:

1. A retrofocus type lens system having ultra-wide angle of view comprising a first positive meniscus lens component, a second negative meniscus lens component, a third negative meniscus lens component, a fourth positive lens component, a fifth negative meniscus lens component, a sixth lens component having positive refractive power, a seventh lens component having negative refractive power, an eighth positive meniscus lens component and a ninth positive lens component, said lens system satisfying the following conditions:

1. $1.8f < f_B < 2.3f$
2. $4.5f < f_1 < 6.5f$
3. $4.5f < f_4 < 6f$
4. $0.05f < d_{10} < 0.1f$
5. $0.6f < D_6 < 0.75f$ wherein, the reference symbol $f$ represents the total focal length of the entire lens system as a whole, $f_B$ is the back focal length of the entire lens system as a whole, the reference symbol $f_1$ designates the focal length of the first lens component, the reference symbol $f_4$ denotes the focal length of the fourth lens component, the reference symbol $d_{10}$ represents the airspace between the fifth and sixth lens components, and the reference symbol $D_6$ designates the thickness of the sixth lens component.

2. A retrofocus type lens system having ultra-wide angle of view according to claim 1, in which said lens system has the following numerical data:

| | | | |
|---|---|---|---|
| $r_1 = 1.9603$ | | | |
| | $d_1 = 0.2435$ | $n_1 = 1.6516$ | $\nu_1 = 58.7$ |

-continued

| | | |
|---|---|---|
| $r_2 = 3.6956$ | | |
| $d_2 = 0.0054$ | | |
| $r_3 = 1.3287$ | | |
| $d_3 = 0.0812$ | $n_2 = 1.8061$ | $\nu_2 = 40.9$ |
| $r_4 = 0.6476$ | | |
| $d_4 = 0.3884$ | | |
| $r_5 = 1.2674$ | | |
| $d_5 = 0.0541$ | $n_3 = 1.8061$ | $\nu_3 = 40.9$ |
| $r_6 = 0.6552$ | | |
| $d_6 = 0.1477$ | | |
| $r_7 = 6.2049$ | | |
| $d_7 = 0.1823$ | $n_4 = 1.78472$ | $\nu_4 = 25.7$ |
| $r_8 = -10.4225$ | | |
| $d_8 = 0.0054$ | | |
| $r_9 = 1.1000$ | | |
| $d_9 = 0.0541$ | $n_5 = 1.66755$ | $\nu_5 = 41.9$ |
| $r_{10} = 0.5763$ | | |
| $d_{10} = 0.0741$ | | |
| $r_{11} = 1.4141$ | | |
| $d_{11} = 0.0812$ | $n_6 = 1.757$ | $\nu_6 = 47.9$ |
| $r_{12} = 0.5532$ | | |
| $d_{12} = 0.5843$ | $n_7 = 1.64769$ | $\nu_7 = 33.8$ |
| $r_{13} = -0.7845$ | | |
| $d_{13} = 0.1055$ | | |
| $r_{14} = -1.6733$ | | |
| $d_{14} = 0.3706$ | $n_8 = 1.7432$ | $\nu_8 = 49.4$ |
| $r_{15} = -0.7836$ | | |
| $d_{15} = 0.0812$ | $n_9 = 1.80518$ | $\nu_9 = 25.4$ |
| $r_{16} = 3.7807$ | | |
| $d_{16} = 0.0438$ | | |
| $r_{17} = -1.9328$ | | |
| $d_{17} = 0.1353$ | $n_{10} = 1.618$ | $\nu_{10} = 63.4$ |
| $r_{18} = -0.7769$ | | |
| $d_{18} = 0.0054$ | | |
| $r_{19} = -5.9327$ | | |
| $d_{19} = 0.1515$ | $n_{11} = 1.618$ | $\nu_{11} = 6.34$ |
| $r_{20} = -1.1730$ | | |
| $f = 1.0$, | $f_B = 2.0154$ | |
| $f_1 = 6.07$, | $f_4 = 4.98$ | |

3. A retrofocus type lens system having ultra-wide angle of view according to claim 1, in which said lens system has the following numerical data:

| | | |
|---|---|---|
| $r_1 = 1.7817$ | | |
| $d_1 = 0.2433$ | $n_1 = 1.6516$ | $\nu_1 = 58.7$ |
| $r_2 = 3.4447$ | | |
| $d_2 = 0.0054$ | | |
| $r_3 = 1.1695$ | | |
| $d_3 = 0.0811$ | $n_2 = 1.8061$ | $\nu_2 = 40.9$ |
| $r_4 = 0.6110$ | | |
| $d_4 = 0.3103$ | | |
| $r_5 = 1.8022$ | | |
| $d_5 = 0.0541$ | $n_3 = 1.8061$ | $\nu_3 = 40.9$ |
| $r_6 = 0.7048$ | | |
| $d_6 = 0.1854$ | | |
| $r_7 = 7.2191$ | | |
| $d_7 = 0.1768$ | $n_4 = 1.78472$ | $\nu_4 = 25.7$ |
| $r_8 = -10.3874$ | | |
| $d_8 = 0.0054$ | | |
| $r_9 = 1.1716$ | | |
| $d_9 = 0.0541$ | $n_5 = 1.66755$ | $\nu_5 = 41.9$ |
| $r_{10} = 0.6349$ | | |
| $d_{10} = 0.0746$ | | |
| $r_{11} = 1.3307$ | | |
| $d_{11} = 0.0811$ | $n_6 = 1.757$ | $\nu_6 = 47.9$ |
| $r_{12} = 0.5316$ | | |
| $d_{12} = 0.6140$ | $n_7 = 1.64769$ | $\nu_7 = 33.8$ |
| $r_{13} = -0.8921$ | | |
| $d_{13} = 0.1031$ | | |
| $r_{14} = -2.2067$ | | |
| $d_{14} = 0.3563$ | $n_8 = 1.7432$ | $\nu_8 = 49.4$ |
| $r_{15} = -0.8404$ | | |
| $d_{15} = 0.0811$ | $n_9 = 1.80518$ | $\nu_9 = 25.4$ |
| $r_{16} = 3.2781$ | | |
| $d_{16} = 0.0438$ | | |
| $r_{17} = -1.9646$ | | |
| $d_{17} = 0.1351$ | $n_{10} = 1.618$ | $\nu_{10} = 63.4$ |
| $r_{18} = -0.8301$ | | |
| $d_{18} = 0.0054$ | | |
| $r_{19} = -8.1453$ | | |
| $d_{19} = 0.1514$ | $n_{11} = 1.618$ | $\nu_{11} = 63.4$ |
| $r_{20} = -1.1405$ | | |
| $f = 1.0$, | $f_B = 2.0154$ | |
| $f_1 = 5.35$, | $f_4 = 5.45$ | |

* * * * *